United States Patent [19]

Yamada et al.

[11] 4,266,967
[45] May 12, 1981

[54] PROCESS FOR PRODUCING METALLIZED PELLETS FROM RAW PELLETS BY CONTROLLING DISTRIBUTION OF TEMPERATURE IN A ROTARY KILN

[75] Inventors: Yasuteru Yamada, Wakayama; Kenji Kadota, Niihama, both of Japan

[73] Assignees: Sumitomo Metal Industries, Ltd., Osaka; Sumitomo Heavy Industries, Ltd., Tokyo, both of Japan

[21] Appl. No.: 64,001

[22] Filed: Aug. 6, 1979

Related U.S. Application Data

[63] Continuation of Ser. No. 830,215, Sep. 2, 1977, abandoned, which is a continuation of Ser. No. 662,278, Feb. 27, 1976, abandoned.

[51] Int. Cl.³ .............................................. C21B 13/08
[52] U.S. Cl. ............................................. 75/36; 75/5; 266/113; 266/173; 432/18
[58] Field of Search ................... 75/3, 4, 5, 29, 33–36; 266/113, 134, 173; 432/18, 85, 103

[56] References Cited

U.S. PATENT DOCUMENTS

| | | | |
|---|---|---|---|
| 3,133,812 | 5/1964 | Moklebust | 75/33 |
| 3,170,786 | 2/1965 | Moklebust | 75/34 |
| 3,206,299 | 9/1965 | Senior et al. | 75/34 |
| 3,262,771 | 7/1966 | Ban | 75/4 |
| 3,386,816 | 6/1968 | English | 75/3 |
| 3,653,876 | 4/1972 | Wienert | 75/33 |
| 3,850,613 | 11/1974 | Allen | 75/4 |
| 3,895,936 | 7/1975 | Toepell | 75/29 |

OTHER PUBLICATIONS

Japan Chemical Society, ed., *Kagaku Binram* (Chemical Handbook), Published by Maruzenkabushikikasha, pp. 270–271, 368–369.

*Primary Examiner*—Michael L. Lewis
*Attorney, Agent, or Firm*—Frishauf, Holtz, Goodman & Woodward

[57] ABSTRACT

A process for reducing pellets containing metal oxides, such as chrome oxide, iron oxide, zinc oxide, etc. with the contained carbon to metallized pellets in a rotary kiln, characterized by carrying out the reduction while blowing air or spraying water into the portion near the charge end of the kiln in order to prevent too rapid heating of the raw pellets is disclosed.

4 Claims, 6 Drawing Figures

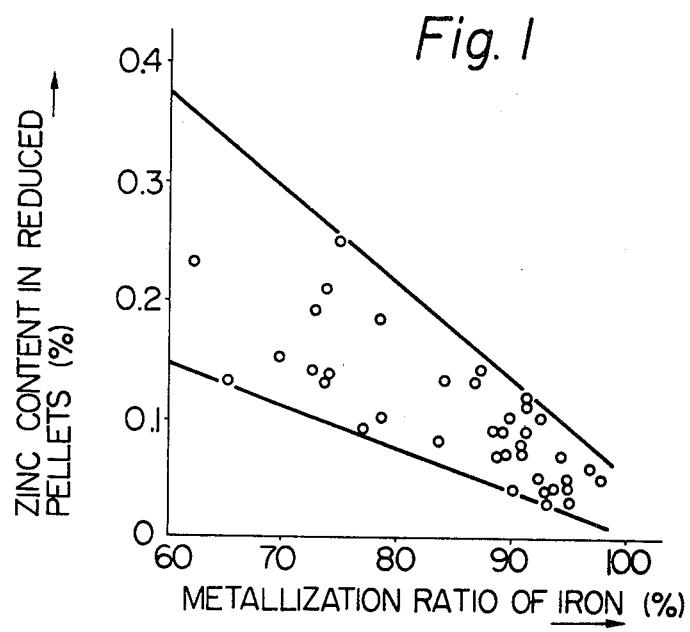
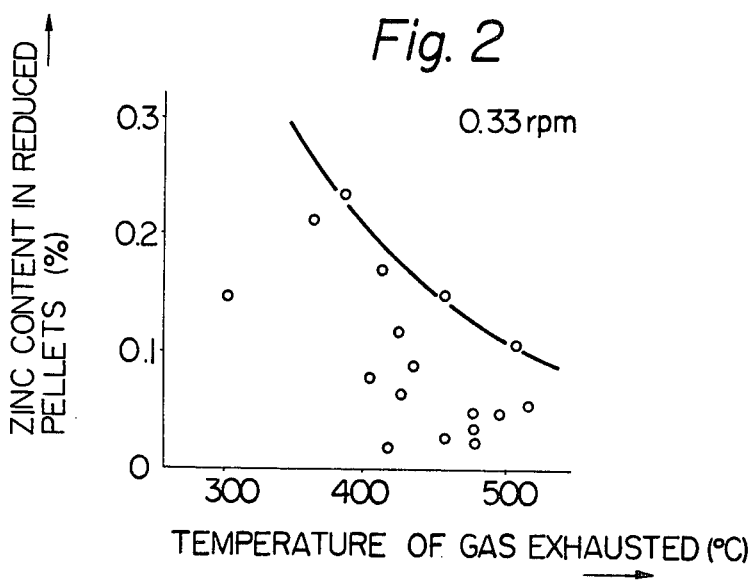

PROCESS FOR PRODUCING METALLIZED PELLETS FROM RAW PELLETS BY CONTROLLING DISTRIBUTION OF TEMPERATURE IN A ROTARY KILN

This a continuation of application Ser. No. 830,215, filed Sept. 2, 1977, now abandoned, which in turn is a continuation of Ser. No. 662,278, filed Feb. 27, 1976, now abandoned.

BACKGROUND OF THE INVENTION

This invention relates to a process for reducing raw pellets containing metal oxides, such as iron oxide, zinc oxide, etc. to metallized pellets having a high metal content in a rotary kiln without forming powder of the pellets in the kiln or without ring formation in the kiln, and more particularly relates to a process for producing the metallized pellets by blowing air or spraying water into the portion near the charge end of the kiln in order to obtain metallized pellets.

It is desirable to recycle the iron-containing dust exhausted from blast furnace, converter furnace, electric furnace and open hearth furnace, etc. into the blast furnace in order to recover iron therefrom and to prevent environmental pollution. Furthermore, since the dust has about 50% by weight of iron, the reuse of the dust is desirable from the point of view of saving material resources.

The term "raw pellets" in the specification and the claims means pellets obtained by pelletizing the iron works dust exhausted from a blast furnace, electric furnace, converter furnace and/or open hearth furnace, etc. or a mixture of the dusts and optionally a carbon source, such as coal or coke. The term "iron-containing dust" in the specification and the claims means powdery materials withdrawn as by-products from blast furnace, electric furnace, converter furnace or open hearth furnace, etc. for smelting a metal or for making a metal. The term "metallized pellets" in the specification and the claims means pellets with a high concentration of iron obtained by chemically reducing said raw pellets.

It was known that pellets having a high metallic iron content can be prepared by reducing the raw pellets in a rotary kiln. One process for reducing the raw pellets in the kiln comprises the step of charging the pellets into the kiln, and the step of reducing the metal oxides contained in the raw pellets at a high temperature and at the same time volatilizing other metals, particularly zinc. The reduction of the metal oxides with carbon is represented by the following equation:

$$MO + C \rightarrow M + CO$$

wherein M is a metal element.

Coal or coke may be mixed with the dust before pelletizing it. When the iron-containing dust has a high carbon content, the coal or coke may be unnecessary to be mixed with the dust.

The dust can be generally preheated at a temperature of 400° C. or less so that carbon in pellets or metal oxide may not be burnt. Particularly, dust containing wustite or metallic iron can be preheated at a temperature only below 200° C., because wustite or metallic iron is likely to be oxidized and subjected to exothermic reaction temperature above 200° C. Therefore, preferably the iron-containing dust is preheated at a temperature below 200° C.

One prior process for reducing the raw pellets to the metallized pellets has the following disadvantages: When the raw pellets are introduced into a rotary kiln, the raw pellets are ground during their passage through the kiln and as a result a ring is formed in the kiln. Therefore, the continuous operation in the rotary kiln is impossible. The cause of the ring formation has not been disclosed in the prior art.

BRIEF DESCRIPTION OF THE DRAWINGS

FIG. 1 is a graph showing the relationship between the zinc content in the resulting metallized pellets and metallization ratio of iron;

FIG. 2 is a graph showing the relationship between the zinc content in the resulting metallized pellets and the temperature of gas exhausted from the charge end of kiln;

The inventors of the present invention have carried out substantial research in order to prevent the ring formation.

When the raw pellets are heated in a rotary kiln at an elevated temperature, ferric oxide ($Fe_2O_3$) contained in the raw pellets are reduced to metallic iron via $Fe_3O_4$ and FeO. For example, the raw pellets having the components shown in Table 1 were heated in a rotary kiln 6.57 m long and 0.46 m internal diameter to reduce iron oxide to metallic iron and to reduce zinc oxide and volatilize the resulting metallic zinc.

TABLE 1

| Components of raw pellets (%) | | | | | | | |
|---|---|---|---|---|---|---|---|
| $Al_2O_3$ | $SiO_2$ | Zn | C | Metallic Fe | $Fe_2O_3$ | FeO | CaO |
| 1.2 | 2.7 | 0.51 | 13.1 | 2.6 | 50.3 | 16.2 | 3.6 |

There pellets contain 50.4% of total Fe.

We determined the zinc content in the resulting metallized pellets and the metallization ratio (the proportion of metallic iron to total iron) in the pellets. The above experiments were repeated many times using pellets having different components. The relationship between the zinc content in the resulting metallized pellets and metallization ratio of iron is shown in FIG. 1.

It may be stated from FIG. 1 that the metallization ratio of iron oxide has a great influence on the zinc content in the metallized pellets.

Raw pellets having the components mentioned above were reduced in a rotary kiln as mentioned above at a speed of rotation of 0.33 rpm. The reducing procedures were weight. From the results of FIG. 2, the temperature of exhaust gas tends to be more than about 520° C. in order to obtain pellets having a zinc content below 0.1% weight. The above experiments were carried out without blowing air or spraying water into the portion near the charge end of the kiln. Therefore, a ring was formed at a distance of 2 meters from the discharge end of kiln. As a result, it was found that a continuous operation of rotary kiln was impossible over more than 10–12 hours.

Figure 3:
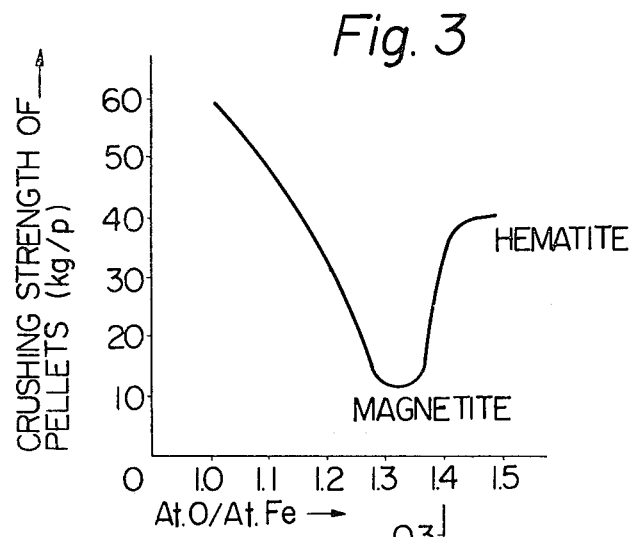
FIG. 3 is a graph showing the relationship between the ratio of At O/At Fe and the crushing strength of the pellets at each reducing stage.

The ratio of the number of oxygen atoms bonded to iron atoms in the raw pellets to the number of iron atoms in the raw pellets (hereinunder abbreviated as At O/At Fe) decreases as the reduction of the raw pellets proceeds. We have carried out a variety of experiments for investigating the transition of the crushing strength of the pellets. The results are shown in FIG. 3. From the results, it is understood that the crushing strength of the pellet is extremely low at the magnetite stage. It has been found that when the temperature of pellets is rapidly raised at the magnetite stage which magnetite is formed, the crushing strength of the pellets is weak, and in other words when the temperature is rapidly raised during the magnetite stage the pellets are very likely to powder and a ring formation is very likely to be formed in the rotary kiln.

We have found that the rate of raising the temperature of the raw pellets in the range between about 600° C.–about 800° C. has an influence on the formation of the ring formation, that is when the raw pellets are rapidly heated in said range, the ring formation tends to occur.

Considering the above discovery and the above experimental results, we have carried out research on the process for reducing the raw pellets in the rotary kiln without ring formation.

Figure 4:
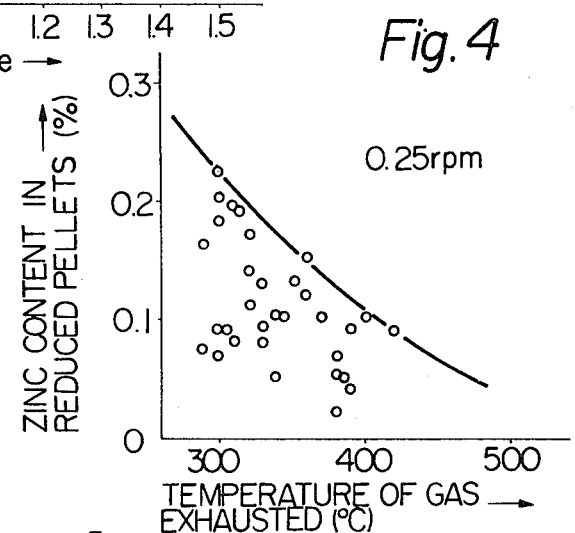
FIG. 4 is a graph showing the relationship between the zinc content in the resulting metallized pellets and the temperature of gas exhausted from the charge end of kiln.

Raw pellets having the components shown in Table 1 were reduced in a rotary kiln at a speed of rotation of 0.25 rpm. The reducing procedures were carried out at the different temperatures of exhaust gas many times. The relationship between the zinc content in the resulting metallized pellets and the temperature is shown in FIG. 4. The retention time of the raw pellets in case of the rotation of 0.25 rpm is longer by four-thirds than the retention time of the raw pellets in case of the rotation of 0.33 rpm. From the results of FIG. 4, the temperature of gas exhausted from the charge end of kiln may be as low as about 420° C. in order to obtain pellets having a zinc content below 0.1% by weight. We have found when the residence time of the raw pellets was lengthened the reducing procedure could be continued without any trouble, that is ring formation. However, when the rotary kiln is operated at slow speed of rotation, this tends to be costly because it lowers the productivity per unit volume of the rotary kiln.

Furthermore, when a longer rotary kiln is used, it is expected that the temperature near the charge end will be lowered to such an extent that the ring may not be formed in the kiln. However, this tends to be also costly, because it lowers the productivity per unit volume of the rotary kiln.

SUMMARY OF THE INVENTION

We have found that when air or water in a spray state is introduced into the portion near the charge end of the kiln, too rapid heating of the raw pellets in the kiln can be avoided in the range between from about 600° C. to about 800° C.

Therefore, it is an object of this invention to provide a process for reducing the raw pellets prepared from the iron-containing dust exhausted from the iron plants to metallized pellets in a rotary kiln without ring formation in the kiln.

Another object of this invention is to provide a process for reducing the raw pellets with the same productivity per unit volume of rotary kiln as the prior process for reducing the pellets.

DETAILED DESCRIPTION OF THE INVENTION

This invention relates to a process for chemically reducing raw pellets to metallized pellets which comprises charging the raw pellets containing an appropriate amount of carbon source into a rotary kiln, and reducing the metal oxides contained in the raw pellets with the carbon, characterized in that air is blown or water is sprayed into the portion which is near the charge end of the kiln, and in which the combustion may not occur, or air or water in a spraying state may be introduced into the portion at which combustion occurs, provided that introduction of air or water in a spraying state can lower the temperature of the portion.

Figure 5:
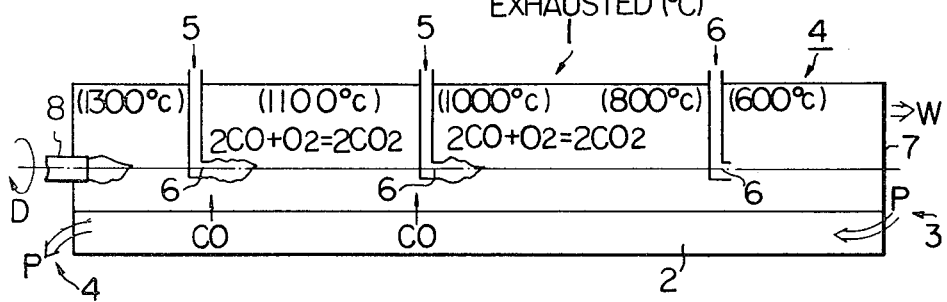
FIG. 5 is flow sheet showing the stages in reducing the raw pellets.

This invention is further illustrated by the non-limitative drawings. Referring to FIG. 5, raw pellets containing carbon are charged into entrance 3 for pellets of rotary kiln and are moved to exit 4 for pellets. Fuel oil is fed through burner 8. Air for combustion of carbon monoxide is fed into kiln 1 through feeding pipes 5, and air or water in a spraying state is fed into kiln 1 through inlet 6. Kiln 1 may be equipped with several inlets. When air or water in a spray state is fed into the portion near charge end 7 of kiln 1 through pipe 6, the temperature of the portion is lowered, whereby too rapid heating of the pellets 2 near charge end 7 can be avoided. Metal oxides contained in the pellets react with carbon to form metal and carbon monoxide. The carbon monoxide is burnt to form carbon dioxide. The temperature of the combustion portion of kiln 1 generally is more than 950° C. During the reducing reaction, zinc is vaporized. Before introducing the raw pellets into kiln 1, coal or coke may be added to the pellets as a reducing agent.

The raw pellets may be predried to a temperature below 400° C. so that carbon contained therein is not burnt before introducing them in the kiln.

Figure 6:
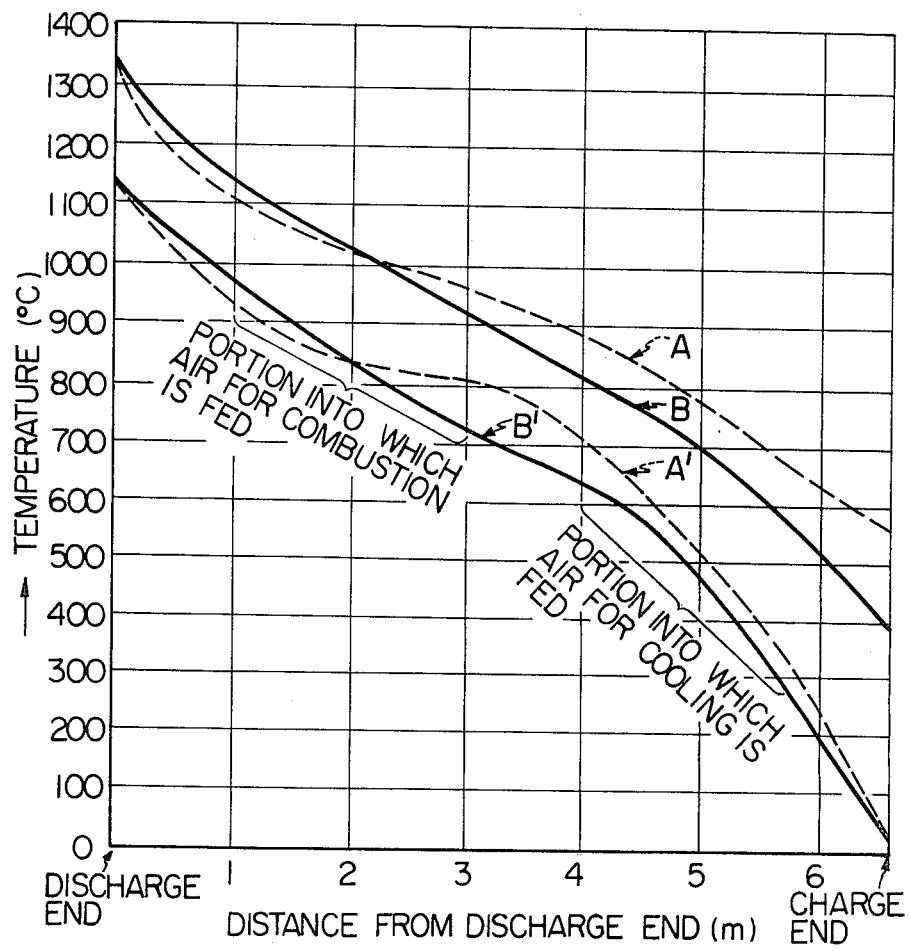
FIG. 6 is a graph showing the distribution of temperature in the kiln according to this invention and the distribution of temperature in the kiln in case of neither blowing air nor spraying water.

FIG. 6 shows the distribution of temperature in the kiln in case of operating the rotary kiln at the same rotational frequency. Curve A is the distribution of temperature of gas in case of not introducing air or water near the charge end. Curve B is the distribution of temperature of gas in case of introducing air or water in a spray state near the charge end. Curve A' is the distribution of temperature of the raw pellets in case of not introducing air or water near the charge end. Curve B' is the distribution of the temperature of the raw pellets in case of introducing air or water in a spray state near the charge end. The temperature of the raw pellets in the charge end of the kiln was 20° C. It is apparent from FIG. 6 that when air is blown or water is sprayed near the charge end, the heating curve of the raw pellets in the range between from about 600° C. to about 800° C. is less steep than when neither air is blown, nor water is sprayed near the charge end.

In the example shown in FIG. 6, when air or water is introduced into the portion near the charge end, the atmospheric temperature of the charge end is lower by about 170° C. than when no air or water is introduced into said portion. Therefore, there is little possibility of breakdown of the pellets by heat strain. However, the atmospheric temperature of the charge end in case of introducing air or water into said portion can be controlled by adjusting the amount of aid introduced into said portion. Furthermore, specific heat of the pellets is higher than that of the gas, so the temperature of the pellets is always lower than the temperature of gas. The reason why the temperature of gas in the combustion area in the process according to the present invention is higher than the temperature of gas in the prior process is that in the present invention all carbon monoxide is burnt in the portion between the discharge end and the center of the kiln.

Air or water in a spray state for cooling is added to the portion at which combustion may not occur. In other words, air or water in a spray state is added to the portion of the kiln so that introduction of air or water does not promote the heating of the portion, but cools the portion. Therefore, air or water in a spray state may be added near the charge end.

Alternatively, air or water in a spray state may be introduced into the portion at which combustion occurs, provided that introduction of air or water in a spraying state can lower the temperature of the portion.

The distance from the charge end at which the air or the water in a spray state is introduced and the amount of air or water introduced are interdependent variables. However, air or water in a spray state is introduced into the portion near the charge end so as to insure that the heating slope of the raw pellets becomes lower in the range between about 600° C. and about 800° C. It is desirable if the air or water in a spray state is introduced into the portion in the range between 3/7 of the entire length of the kiln as measured from the charge end.

The amount of air or water in a spray state introduced can be easily decided by those skilled in the art.

The amount of gas for combustion feed and the rotational frequency of the kiln are not critical.

According to the present invention using a rotary kiln, metallized pellets having a zinc content below 0.1% by weight and a high metallization ratio can be prepared from raw pellets with the same productivity per unit volume of rotary kiln as the prior process and without ring formation in the kiln.

According to the present invention, the rotary kiln can be operated at the same rate of rotation as in the prior process.

The present invention is further illustrated by the following Example. However, this invention should not be limited by this Example. The percent and parts in the Example are based on weight unless otherwise specified.

EXAMPLE 1

The raw pellets having the components shown in foregoing Table 1 were heated in a rotary kiln 6.57 m long and 0.46 m internal diameter to reduce iron oxide to metallic iron and to reduce zinc oxide and volatilize the resulting metallic zinc. The kiln was equipped with a shell-fan, thermometer, coal-charging means, gas-analyzing means and dust-collecting means. Air for cooling was blown at a distance of 2 m from the charge end of the kiln. The conditions of the experiment carried out are shown in Table 2.

The similar procedures of Example 1 were repeated except that air for cooling was not blown as control tests. The conditions of the control tests carried out were also shown. The results are shown in Table 2.

TABLE 2

|  | Example 1 | Control test 1 | Control test 2 |
|---|---|---|---|
| Temperature of pellets charged (°C.) | 20 | 20 | 20 |
| Amount of pellets charged (Kg/hr) | 50 | 50 | 35 |
| Speed of rotation of the kiln (rpm) | 1/3 | 1/3 | 1/4 |
| Retention time of the pellets in the kiln (min.) | 290 | 290 | 370 |
| Amount of fuel oil used (Kg/hr) | 4.0 | 4.0 | 4.0 |
| Temperature of exhaust gas (°C.) | 400 | 570 | 420 |
| Temperature of object pellets (°C.) | 1120 | 1120 | 1110 |
| Whether ring is formed | No more than | Yes | No more than |
| Time for which the continuous operation was possible (hr) | 200 | 10 | 200 |
| Whether air for cooling was blown | Yes | No | No |
| Metallization ratio of iron (%) | 94 | 94 | 93 |
| Zinc content in reduced pellets (%) | 0.04 | 0.06 | 0.06 |

In control test 1 a ring was formed in the kiln. Therefore, continuous operation of the kiln was impossible. In control test 2, the rotary kiln was operated at slow speed of rotation. This tends to be costly, because it lowered the productivity per unit volume of the rotary kiln.

What we claim is:

1. A process for reducing raw pellets prepared from iron-containing dust exhausted from an iron plant to metallized pellets having high metallic iron content wherein the raw pellets containing metallic oxides and sufficient carbon to reduce said oxides are charged into a charge end of a rotary kiln and are heated therein, and wherein the metal oxides contained in the raw pellets are reduced by the carbon, which comprises introducing cooling water in a spray state into a portion of the interior of the rotary kiln which is in the first 3/7ths of the entire length of the kiln as measured from the charge end thereof and in which combustion does not occur, to lower the temperature of said portion and to reduce the rate of heating the raw pellets in the temperature range of from about 600° C. to about 800° C.

2. The process of claim 1, wherein the raw pellets contain about 0.5 percent by weight of zinc and the resulting metallized pellets contain less than 0.1 percent by weight of zinc.

3. A process for reducing raw pellets prepared from iron-containing dust exhausted from an iron plant to metallized pellets having high metallic iron content wherein the raw pellets containing metallic oxides and sufficient carbon to reduce said oxides are charged into a charge end of a rotary kiln and are heated therein, and wherein the metal oxides contained in the raw pellets are reduced by the carbon, which comprise introducing cooling water in a spray state into a portion of the interior of the kiln which is in the first 3/7ths of the entire length of the kiln as measured from the charge end thereof and to lower the temperature of said portion and to reduce the heating rate of the raw pellets in the temperature range of from about 600° C. to about 800° C.

4. The process of claim 3, wherein the raw pellets contain about 0.5 percent by weight of zinc and the resulting metallized pellets contain less than 0.1 percent by weight of zinc.

* * * * *